(12) United States Patent
Gupta et al.

(10) Patent No.: US 9,538,258 B2
(45) Date of Patent: Jan. 3, 2017

(54) METHOD AND APPARATUS FOR IMPROVING VIEWER ENGAGEMENT IN VIDEO ADVERTISING

(71) Applicant: Adobe Systems Incorporated, San Jose, CA (US)

(72) Inventors: Naresh Chand Gupta, Noida (IN); Anuj Jain, New Delhi (IN); Niraj Gupta, Faridabad (IN)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 123 days.

(21) Appl. No.: 14/077,555

(22) Filed: Nov. 12, 2013

(65) Prior Publication Data
US 2015/0135211 A1    May 14, 2015

(51) Int. Cl.
| | |
|---|---|
| H04H 20/14 | (2008.01) |
| H04N 5/445 | (2011.01) |
| H04N 21/81 | (2011.01) |
| H04N 21/454 | (2011.01) |
| H04N 21/431 | (2011.01) |
| H04N 21/234 | (2011.01) |
| H04N 21/432 | (2011.01) |
| H04N 21/442 | (2011.01) |
| H04N 21/8355 | (2011.01) |

(52) U.S. Cl.
CPC ...... *H04N 21/812* (2013.01); *H04N 21/23424* (2013.01); *H04N 21/4316* (2013.01); *H04N 21/4325* (2013.01); *H04N 21/44222* (2013.01); *H04N 21/454* (2013.01); *H04N 21/8355* (2013.01)

(58) Field of Classification Search
CPC .................... H04N 21/23424; H04N 21/4316; H04N 21/454
USPC ...................................... 725/22, 37
See application file for complete search history.

(56) References Cited

U.S. PATENT DOCUMENTS

| | | | | |
|---|---|---|---|---|
| 2002/0191950 | A1* | 12/2002 | Wang | 386/46 |
| 2004/0146277 | A1* | 7/2004 | Nishitani | 386/68 |
| 2008/0152300 | A1* | 6/2008 | Knee et al. | 386/68 |
| 2009/0222850 | A1* | 9/2009 | Darnell | 725/32 |
| 2013/0198013 | A1* | 8/2013 | Shehan et al. | 705/14.73 |
| 2014/0143806 | A1* | 5/2014 | Steinberg et al. | 725/34 |

OTHER PUBLICATIONS

"Configuring a Skip Button", downloaded from http://www.longtailvideo.com/support/open-video-ads/22836/corifiguring-a-skip-button/.

* cited by examiner

*Primary Examiner* — Pankaj Kumar
*Assistant Examiner* — Franklin Andramuno
(74) *Attorney, Agent, or Firm* — Keller Jolley Preece

(57) ABSTRACT

A computer implemented method and apparatus for improving viewer engagement in video advertising. The method comprises configuring a plurality of skip options for presentation in advertising content, such that each skip option of the plurality of skip options is presented in series for a limited duration during display of the advertising content until a presented one of the skip options is selected.

20 Claims, 3 Drawing Sheets

METHOD AND APPARATUS FOR IMPROVING VIEWER ENGAGEMENT IN VIDEO ADVERTISING

BACKGROUND OF THE INVENTION

Field of the Invention

Embodiments of the present invention generally relate to video advertising and, more particularly, to a method and apparatus for improving viewer engagement in video advertising.

Description of the Related Art

Video content generates high engagement levels with viewers, and therefore presents an attractive monetization opportunity for advertisers to show relevant advertisement videos to viewers of video content. Advertisement videos are often presented with a skip option, either when the advertisement video commences or at a predetermined time period shortly thereafter, allowing a viewer to select the skip option in order to skip the advertisement video and access the video content of interest.

Often, the viewer selects the skip option so as to skip the advertisement as soon as the skip option becomes available for selection. Thus the viewer is unlikely to have engaged with the advertising content or any branding messages contained therein. Such viewer behavior defeats the purpose of the advertisement.

Therefore, there is a need for a method and apparatus for improving viewer engagement in video advertising.

SUMMARY OF THE INVENTION

A method for improving viewer engagement in video advertising is described. The method configures a plurality of skip options for presentation in advertising content, wherein each skip option is available for selection for a pre-defined duration.

In another embodiment, an apparatus for improving viewer engagement in video advertising is described. The apparatus includes a configuration module for configuring a plurality of skip options for presentation in advertising content, wherein each skip option is available for selection for a pre-defined duration.

In yet another embodiment, a computer readable medium for improving viewer engagement in video advertising is described. The computer readable medium configures a plurality of skip options in advertising content, wherein each skip option is available for selection for a pre-defined duration.

The Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Figure 1:
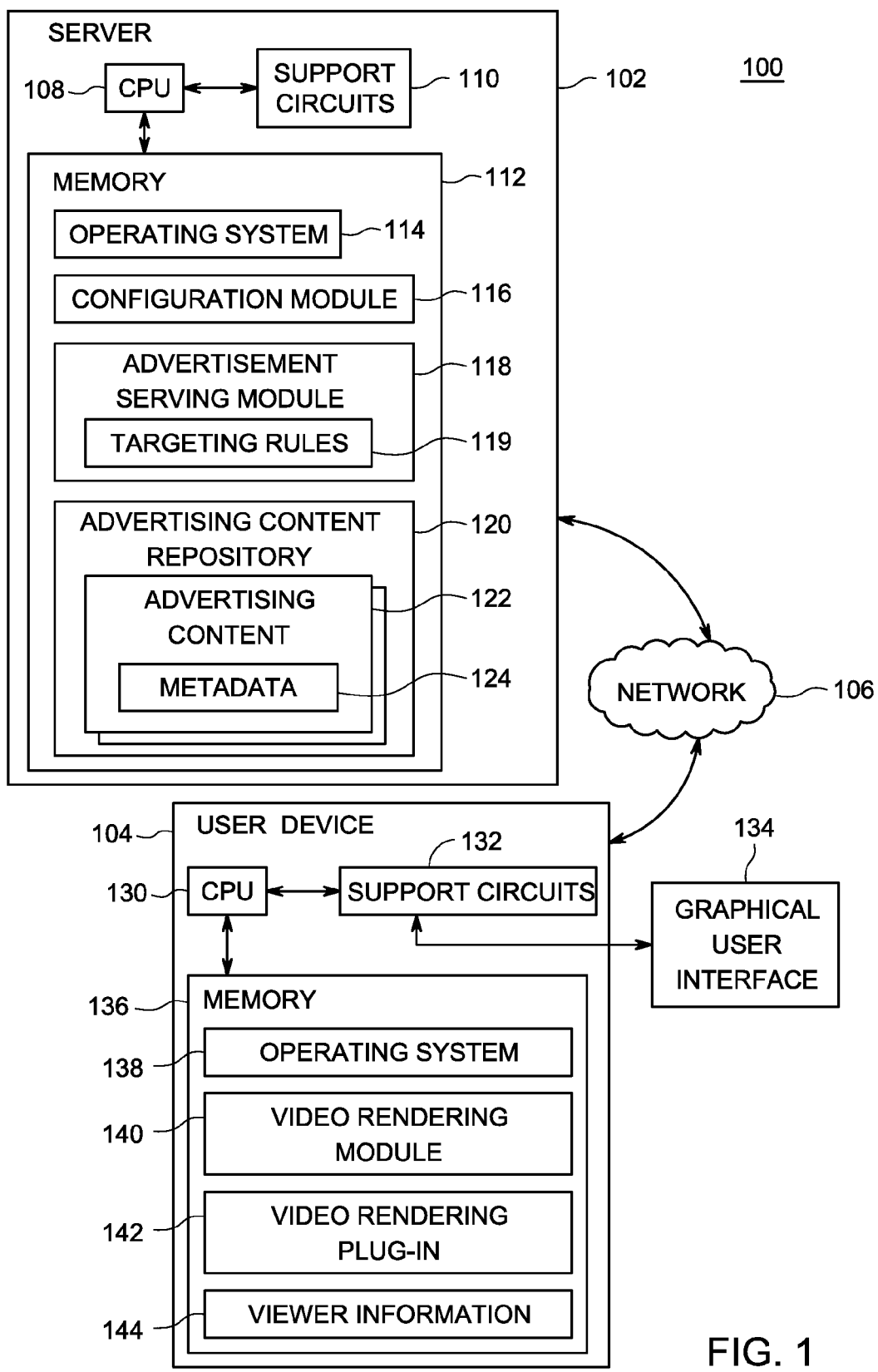
FIG. 1 is a block diagram of a system for improving viewer engagement in video advertising, according to one or more embodiments.

While the method and apparatus is described herein by way of example for improving viewer engagement in video advertising, those skilled in the art will recognize that the method and apparatus for improving viewer engagement in video advertising is not limited to the embodiments or drawings described. It should be understood, that the drawings and detailed description thereto are not intended to limit embodiments to the particular form disclosed. Rather, the intention is to cover all modifications, equivalents and alternatives falling within the spirit and scope of the method and apparatus for improving viewer engagement in video advertising defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Embodiments of the present invention include a method and apparatus for improving viewer engagement in video advertising. Video content is presented to a viewer along with advertising content, at the beginning, the end or interspersed within the video content. The advertising content includes presentation of an option to skip the advertising content and view the video content. The skip option is only presented to the viewer temporarily, for different durations of time and at different locations within the advertising content. The randomness of presentation of the skip option provides a viewer of advertising content incentive to pay attention to the advertising content in order to be engaged with the advertising content at the time when the skip option is presented.

Advantageously, the present invention allows marketers who use advertising solutions, such as ADOBE® AUDITUDE® or ADOBE® Primetime, to be provided with a more engaged audience of viewers of their advertising content. Due to the temporary nature of the skip option, even viewers who wish to use the skip option have an incentive to pay attention to the advertising content so that they are engaged when the skip option becomes available.

As used herein, video content includes graphics, textual, audio or video content that a viewer is primarily interested in consuming. Advertising content is video that includes marketing content with promotional messaging for example, for a brand. A skip option is a choice that is presented (for example by display) to a viewer of video content, which if selected, ceases presentation of advertising content. As used hereinafter, a skip option is "presented" if it is provided to a viewer in a manner that can be selected, clicked or is actionable to enable desired skipping. In some embodiments, presentation of a skip option includes display of a skip option whose selectability has a time delay, that is, one that is displayed to a viewer before becoming enabled for viewer selection.

Various embodiments of a method and apparatus for video advertising for improved viewer engagement are described. In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description that follow are presented in terms of algorithms or symbolic representations of operations on binary digital signals stored within a memory of a specific apparatus or special purpose computing device or platform. In the context of this particular specification, the term specific apparatus or the like includes a general-purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

FIG. 1 is a block diagram of a system 100 for improving viewer engagement in video advertising, according to one or more embodiments. The system 100 includes a server 102 and a user device 104, communicatively coupled to one another via a network 106. The server 102 is a computing device, for example, a desktop computer, laptop, tablet computer, and the like. The server 102 is a marketing server such as ADOBE® AUDITUDE® that provides advertising content with video content. The server 102 includes a Central Processing Unit (CPU) 108, support circuits 110, and a memory 112. The CPU 108 may include one or more commercially available microprocessors or microcontrollers that facilitate data processing and storage. The support circuits 110 facilitate the operation of the CPU 108 and include one or more clock circuits, power supplies, cache, input/output circuits, and the like. The memory 112 includes at least one of Read Only Memory (ROM), Random Access Memory (RAM), disk drive storage, optical storage, removable storage and/or the like.

The memory 112 includes an operating system 114, a configuration module 116, an advertisement serving module 118, and an advertising content repository 120. The advertisement serving module includes targeting rules 119. The advertising content repository 120 includes a plurality of advertising content 122. Each advertising content 122 of the plurality of advertising content 122 includes metadata 124. In some embodiments, the advertising content repository 120 is remote from the server 102. The operating system 114 may include various commercially known operating systems.

The user device 104 is a computing device that executes desktop media playing software, such as ADOBE® FLASH® Player, a gaming system that streams digital media, such as an XBOX®, and the like. The user device 104 includes a Central Processing Unit (CPU) 130, support circuits 132, and a memory 136. The user device 104 includes or is attached to a graphical user interface 134. The CPU 130 may include one or more commercially available microprocessors or microcontrollers that facilitate data processing and storage. The various support circuits 132 facilitate the operation of the CPU 130 and include one or more clock circuits, power supplies, cache, input/output circuits, and the like. The memory 136 includes at least one of Read Only Memory (ROM), Random Access Memory (RAM), disk drive storage, optical storage, removable storage and/or the like.

The memory 136 includes an operating system 138, a video rendering module 140, a video renderer plug-in 142, and viewer information 144. The operating system 138 may include various commercially known operating systems. The video rendering module 140 includes commercially available media players, such as ADOBE® FLASH® PLAYER, and the like, capable of playing advertising content configured with instructions to present a skip option in the advertising content. For example, the video rendering module 140 can play configured advertising content received from the server 102. The video renderer plug-in 142 collects viewer information 144. The viewer information 144 includes historical data regarding a viewer's use of the skip option including, but not limited to, how long a given skip option is presented before the viewer uses the skip option, whether the viewer changed focus on graphical user interface 134 away from the configured advertising content, and the like.

The network 106 includes a communication system that connects computers (or devices) by wire, cable, fiber optic and/or wireless link facilitated by various types of well-known network elements, such as hubs, switches, routers, and the like. The network 106 may be a part of the Intranet using various communications infrastructure, such as Ethernet, Wi-Fi, a personal area network (PAN), a wireless PAN, Bluetooth, Near field communication, and the like.

In some embodiments, the video rendering module 140 requests advertising content 122 from the server 102 via network 106. In such embodiment, the video rendering module 140 sends the viewer information 144 that was collected by the video renderer plug-in 142 along with the request. The advertisement serving module 118 obtains advertising content 122 from the advertising content repository 120. The advertisement serving module 118 may use various information in selecting the advertising content, such as web analytics data that may include cookies, information on use of applications, websites, or the nature of the video content. The advertisement serving module 118 selects advertising content 122 for presentation by the video rendering module 140.

According to various embodiments, the advertisement serving module 118 sends the selected advertising content 122 to the configuration module 116 for configuring the advertising content 122 with a skip option, prior to sending the advertising content 122 for presentation by the video rendering module 140. The configuration module 116 configures the skip option within the advertising content 122. The skip option may be configured in various ways as described now using examples.

Example 1

The configuration module 116 configures presentation of the skip option randomly in both time and space, that is, when the skip option is presented and where the skip option is presented is selected at random. The configuration module 116 encodes the advertising content 122 with the skip option presented for a pre-defined duration at the randomly generated times and locations.

Example 2

The configuration module 116 configures presentation of the skip option at time intervals based on a duration of the advertising content 122. The duration of the advertising content 122 may be stored in the metadata 124 associated with the advertising content 122. For example, the skip option may be presented up to 6 times for advertising content 122 that is 30 seconds in duration or display the skip option up to 8 times for advertising content 122 that is 40 seconds in duration. In some embodiments, the duration for which the skip option is displayed may be random. In some embodiments, the duration may be a function of the duration of the advertising content 122. For example, the skip option may be defined to be displayed for 10x seconds, where x=duration of advertising content displayed/total advertising content duration. If the total advertising content duration is 1 minute, and the first skip option is displayed after 10 seconds, the duration of the skip option=10*10/60, or 1.66 seconds. If the second skip option is displayed after 20 seconds, the duration is 10*20/60, or 3.33 seconds. In some embodiments, the duration may be a function of the duration of the video content. For example, the skip option may be defined to be displayed for x seconds, where x=duration of video content played/total video content duration. If the total video content duration is 10 minutes, and if the advertising content is shown at the third minute, then the duration to display skip button will be 3/10=30 seconds, while if ad is shown at the fifth minute then duration will be 5/10=50 seconds. The configuration module 116 encodes the advertising content 122 with the skip option presented at time intervals based on the duration of the advertising content 122.

Example 3

The configuration module 116 configures presentation of the skip option based on the branding and promotional messages of the advertising content 122. For example, the metadata 124 of the advertising content 122 may include one or more time points in the advertising content 122 when a promotional message is being relayed or a brand is being presented. These times are provided by the marketer and may be stored in the metadata 124 associated with the advertising content 122. The configuration module 116 uses the one or more time points as blackout positions in the advertising content 122 when the skip option is not to be presented. The configuration module 116 may also use the one or more time points to determine where to display the skip option. The configuration module 116 configures the skip option such that the skip option becomes available for a first time only after one or more of the time points has been passed, thereby ensuring the branding or a promotional message is presented at least once. The metadata 124 may also identify locations of, for example, display of for example, the brand or a logo as blackout locations. The configuration module 116 configures the location of the skip option such that the skip option does not obscure the blackout locations. The configuration module 116 encodes the advertising content 122 with the skip option presented for a pre-defined duration at times based on the time points in locations that avoid the blackout locations.

Example 4

The configuration module 116 configures the skip option based on past behaviors of the viewer of advertising content 122. The video renderer plug-in 142 stores user interactions with the skip option in the viewer information 144. For example, the video renderer plug-in 142 may store how long a skip option is displayed before a user selects the skip option. The video renderer plug-in 142 may also store whether the viewer maintained focus with the display window or viewed another window while the advertising content 122 is playing. The configuration module 116 accesses viewer information 144 that was received with the request for advertising content 122. The configuration module 116 categorizes the viewer based on the behaviors identified in the viewer information 144. For example, a viewer who focuses away (i.e., views a different display window) from the advertising content 122 when the advertising content is played may be categorized as a "busy viewer". A viewer who selects the skip option as soon as it appears, for example, in less than 3 seconds after the skip option has appeared may be categorized as an "impatient viewer". A viewer who does not interact with the advertising content 122 more than 90% of the time may be categorized as a "lazy viewer". A viewer who interacts with the skip button for example, 40%-50% of the time may be categorized as an "average viewer". The viewer categorization may be performed locally by the configuration module 116 or at a remote server. If the viewer categorization is performed at a remote server, the categorization is sent to the configuration module 116. The configuration module 116 configures the skip option according to pre-determined targeting rules 119 for each category of viewer and encodes the advertising content 122 accordingly.

Example 5

The configuration module 116 configures the skip option with a runtime variable that represents a fraction of the duration of the video that has already been played. The duration for which the skip button is configured is based on how much of the video content has been viewed by the user. For example,

```
<video-duration-skip>
    d * total-ad-duration
</video-duration-skip>
```

The configuration module 116 fills in the total-ad-duration based on the duration of the advertising content. The variable (d) is determined by the video renderer plug-in 142. For example, if 90% of the video content has been played, then at runtime, the video renderer plug-in 142 uses 0.90 the variable, d, to identify when to present the skip option. In the current example, the skip option may be shown at 0.90*total-ad-duration or after 90% of the advertising content is displayed (i.e., much later in the advertising content).

The advertisement serving module 118 receives the configured advertising content from the configuration module 116, and sends the configured advertising content to the video rendering module 140 for display on the graphical user interface 134 on the user device 104.

Figure 2:
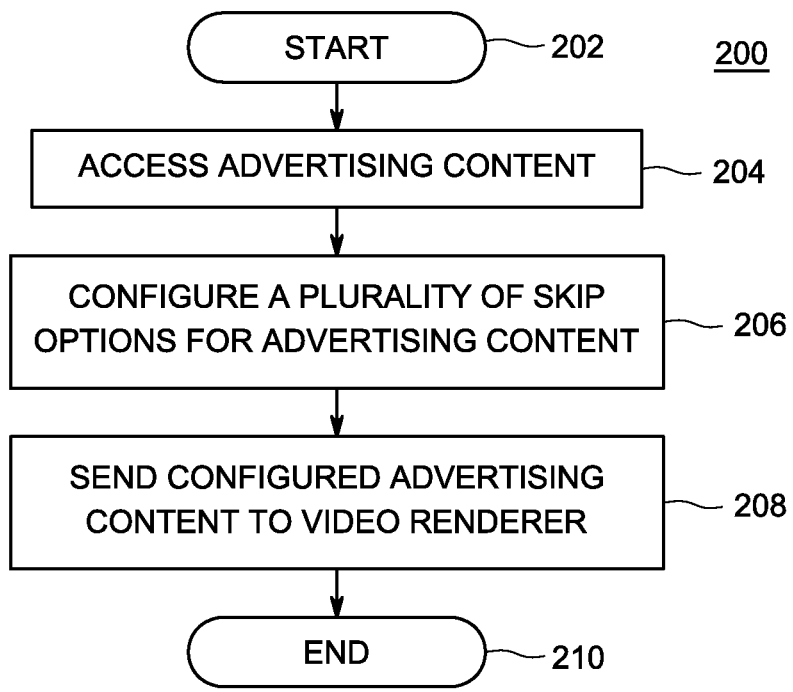
FIG. 2 is a flowchart of a method for improving viewer engagement in video advertising, as performed by the advertising content configuration module of FIG. 1, according to one or more embodiments.

FIG. 2 is a flow diagram of a method 200 for configuring advertising content with a skip option as performed by the configuration module 116 of FIG. 1, according to one or more embodiments. The method 200 configures the skip option in the advertising content such that when presented to a user, the viewer's engagement with the advertising content is improved. In some embodiments, the advertising content is requested, for example, during live streaming video content. If the advertising content is requested, viewer information may be provided with the request that may determine how the skip option is configured. The method 200 starts at step 202 and proceeds to step 204.

At step 204, the method 200 accesses advertising content. The advertising content includes a brand or promotional message, and a duration. The method 200 proceeds to step 206.

At step 206, the method 200 configures a plurality of skip options in the advertising content. The one or more skip options may be in the form of a SKIP button, an "X" button, a true/false or multiple choice question, or any form that presents a user with the option to provide input that will skip continued viewing of the advertising content. The one or more skip options are provided temporarily, according to one or more embodiments.

For example, a skip option may be encoded with a specified appearance and presented at a specific location within the advertising content using code as follows:

```
{
    "ads": {
        "controls": {
            "skipAd": {
                "enabled": true,
                "html": "<p>SKIP</p>",
                "region": {
                    "id": "my-new-skip-ad-button",
                    "verticalAlign": 3,
                    "horizontalAlign": 3,
                    "backgroundColor": "#FF3300",
                    "opacity": 0.8,
                    "borderRadius": 15,
                    "padding": "0 1 1 13",
                    "width": 60,
                    "height": 20
                }
            }
        },
        ....
    }
}
```

The code defines the appearance of the skip option. In this example, the skip option is in the form of a SKIP button with a specified height, width, opacity, and background color. The code also defines a location where the SKIP button is to be displayed, defined by the vertical and horizontal alignment.

In one embodiment, the method 200 configures the skip option randomly in both time and space, meaning that the times when the skip option is displayed and location of where the skip option is displayed is selected at random. The method 200 encodes the advertising content with the skip option displayed for a pre-defined duration at the randomly generated times and locations. For example, an intermittent skip feature may be added to the above code as follows:

```
"skipAd" :{
    "activeDuration1":0-3,
    "activeDuration2":5-6,
    "activeDuraction3":8-11
```

In some embodiments, the method 200 configures the number of skip option presentations based on duration of the advertising content. For example, the skip option may be configured for presentation 6 times for advertising content that is 30 seconds in duration or presenting the skip option 8 times for advertising content that is 40 seconds in duration. The method 200 determines the duration of the advertising content from metadata that is included with the advertising content. The method 200 encodes the advertising content with the skip option displayed for a duration at time intervals based on the duration of the advertising content. The duration of time that the skip option is displayed may be determined randomly or the duration may be for a pre-defined length of time.

In some embodiments, the method 200 configures the skip option based on the branding and promotional messages of the advertising content. For example, the metadata of the advertising content may include one or more time points indicating the most important times in the advertising content when a promotional message is displayed or a brand is displayed. These times are provided by the marketer and may be stored in the metadata associated with the advertising content. The method 200 uses the one or more time points as blackout positions in the advertising content when the skip option is not to be displayed. The method 200 may also use the one or more time points to determine where to allow the skip option such that the skip option is available for a first time only after one or more of the time points has passed, thereby ensuring the branding or promotional message is displayed at least once. The method 200 encodes the advertising content with the skip option displayed for a pre-defined duration at times based on the time points.

In yet another embodiment, the method 200 configures the skip option based on past behaviors of the viewer. The method 200 accesses viewer information that was received with the request for advertising content. The viewer information may store data for a predefined period of time or store a predefined number of entries, thereby keeping the data in the viewer information current. An example of view profile information may include information as presented below:

Time before skip: 3, 2.8, 5, −1, 3.4, −1, 4.6

Focus time on the ad: 1, 0.5, 0.2

Average time before skipping for the last 6 weeks: 2.8, 3.2, 3.5, 4, 6, 5.2

In the above example, −1 in the "time before skip" entry indicates that the skip option was not used and the advertising content was played to completion. Focus time represents a fraction of time a media player was in focus before the skip option was pressed or the advertising played to completion.

The method 200 categorizes the viewer based on the behaviors identified in the viewer information. The user category may be obtained using various statistical methods.

For example, a viewer who focuses away (i.e., views a different display window) from the advertising content when the advertising content is played may be categorized as a "busy viewer". A viewer who selects the skip option as soon as it appears, for example, in less than 3 seconds after the skip option has appeared may be categorized as an "impatient viewer". A viewer who does not interact with the advertising content more than 90% of the time may be categorized as a "lazy viewer". A viewer who interacts with the skip button for example, 40%-50% of the time may be categorized as an "average viewer".

In the above example, the user waits to use the skip option on average over 3 seconds, and 2 out of 7 times the user viewed the advertising content in its entirety. This user may be categorized as an "average user."

A second example of viewer information may include information as presented below:

Time before skip: 1.1, 1.8, 2.1, 1.6, 2.4, 1.7, 2.3
Focus time on the ad: 1, 1, 1
Average time before skipping for the last 6 weeks: 1.8, 1.7, 1.9, 2.0, 2.2, 1.7

In this second example, the user, on average, uses the skip option in less than 2.5 seconds after the skip option is displayed. The user in this second example may be categorized as an "impatient user".

The method 200 configures the skip option according to pre-determined rules for each category of viewer and encodes the advertising content accordingly. An exemplary rule for a "busy user" may be: "Display skip option only after the focus of the play is on for a minimum of 8 seconds." An exemplary rule for an "impatient user" may be: "Randomize the location, form and time of appearance of the skip option." An exemplary rule for a "lazy user" may be: "Display skip option within 2-3 seconds of the start of the advertising content, but randomize the duration for which the button is active and visible." An exemplary rule for an "average user" may be: "Identify the most probable time at which the user is going to hit the button, and randomize the time of displaying the skip options away from the most probable time".

The method 200 may store the skip option configuration information as an XML file.

Once the advertising content is configured with the skip option, the method 200 proceeds to step 208, where the method 200 sends the skip option configuration information along with the advertising content for display by a video renderer and proceeds to step 210, where the method 200 ends.

Figure 3:
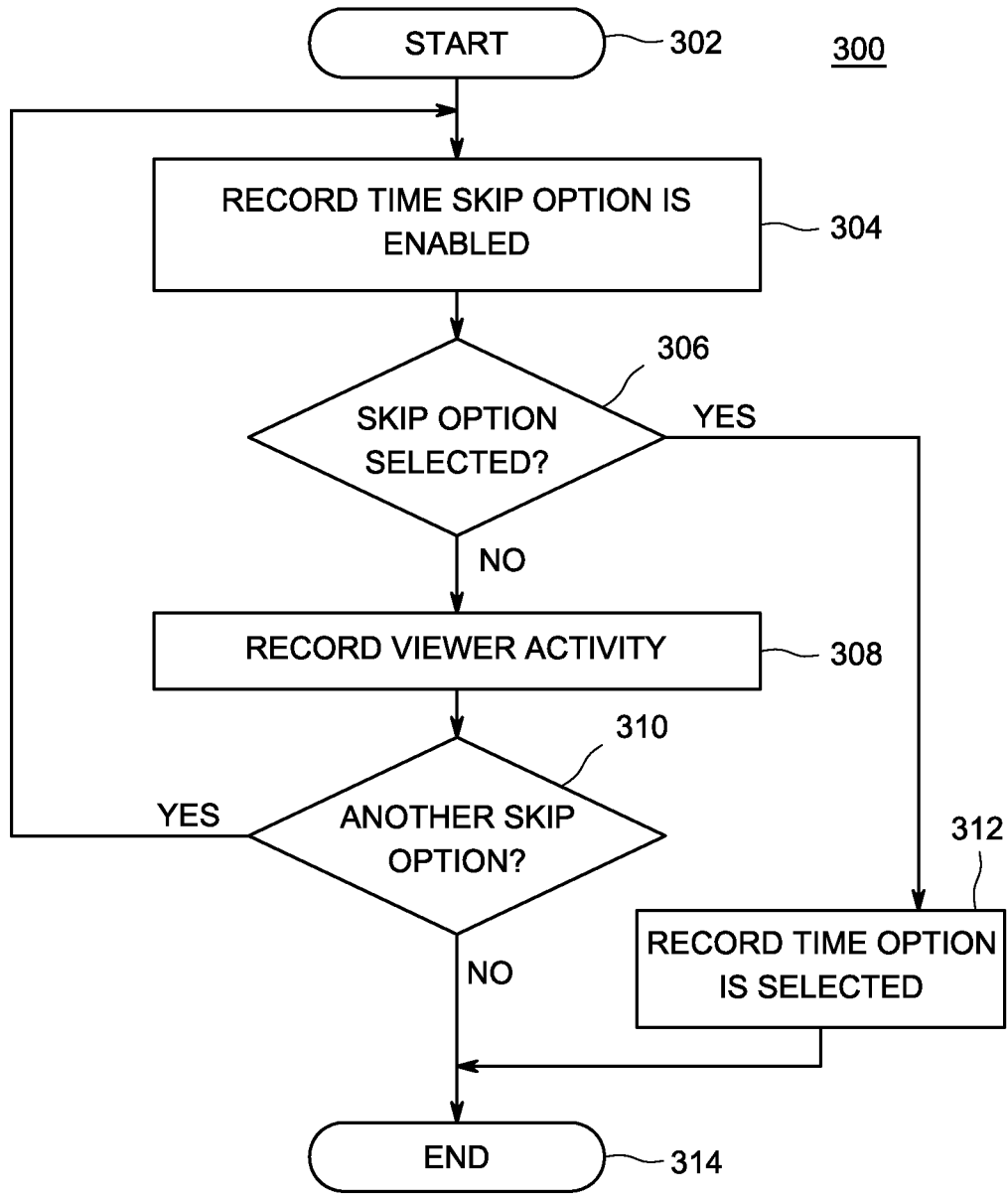
FIG. 3 is a flowchart of a method for presenting configured advertising content, as performed by the video renderer plug-in of FIG. 1, according to one or more embodiments.

FIG. 3 depicts a flow diagram of a method 300 for collecting viewer information as performed by the video renderer plug-in 142 of FIG. 1, according to one more embodiments. The method 300 stores information regarding how long a skip option is presented before a viewer opts to use the skip option. The method 300 starts at step 302 and proceeds to step 304.

At step 304, the method 300 records the start time that a skip option is presented. The method 300 proceeds to step 306, determines whether a skip option has been selected. If the method 300 determines that the skip option has been selected, the method 300 proceeds to step 312, where the method 300 records the time that the skip option was presented before the viewer opted to select the skip option. The method 300 proceeds to step 314 and ends.

However, if at step 306, the method 300 determines that the skip option was not selected, meaning that the duration of the presented skip option has ended and the viewer did not opt to use the skip option, the method 300 proceeds to step 308. At step 308, the method 300 records activity of the viewer. For example, the method 300 may determine that the viewer switched focus from to a screen other than the viewing area of the advertising content.

The method 300 proceeds to 310 where the method 300 determines if another skip option is presented or whether the advertising content has ended. If the method 300 determines that another skip option has been presented, the method 300 proceeds to step 304, where the method 300 iterates until a skip option is selected or until the advertising content has ended. If at step 310 the method 300 determines that the advertising content has ended, the method 300 proceeds to step 314 and ends.

The embodiments of the present invention may be embodied as methods, apparatus, electronic devices, and/or computer program products. Accordingly, the embodiments of the present invention may be embodied in hardware and/or in software (including firmware, resident software, microcode, etc.), which may be generally referred to herein as a "circuit" or "module". Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device. These computer program instructions may also be stored in a computer-usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium include the following: hard disks, optical storage devices, a transmission media such as those supporting the Internet or an intranet, magnetic storage devices, an electrical connection having one or more wires, a portable computer diskette, a random access memory (RAM), a read-only memory (ROM), an erasable programmable read-only memory (EPROM or Flash memory), an optical fiber, and a compact disc read-only memory (CD-ROM).

Computer program code for carrying out operations of the present invention may be written in an object oriented programming language, such as Java®, Smalltalk or C++, and the like. However, the computer program code for carrying out operations of the present invention may also be written in conventional procedural programming languages, such as the "C" programming language and/or any other lower level assembler languages. It will be further appreciated that the functionality of any or all of the program modules may also be implemented using discrete hardware components, one or more Application Specific Integrated Circuits (ASICs), or programmed Digital Signal Processors or microcontrollers.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

The methods described herein may be implemented in software, hardware, or a combination thereof, in different embodiments. In addition, the order of methods may be changed, and various elements may be added, reordered, combined, omitted, modified, etc. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

While the foregoing is directed to embodiments of the present invention, other and further embodiments of the invention may be devised without departing from the basic scope thereof, and the scope thereof is determined by the claims that follow.

The invention claimed is:

1. A computer implemented method comprising:
   providing for display on a graphical user interface, by at least one processor, a plurality of skip options in a single instance of digital advertising content;
   streaming, by the at least one processor, the single instance of digital advertising content;
   presenting on the graphical user interface, during the streaming of the single instance of digital advertising content by the at least one processor, each skip option of the plurality of skip options in series for a limited duration at a random time and a random location during display of the single instance of digital advertising content until a presented one of the skip options is selected or until the single instance of digital advertising content completes;
   detecting, by the at least one processor, a selection of one skip option of the plurality of skip options; and
   in response to detecting the selection of the one skip option of the plurality of skip options, skipping, by the at least one processor, the single instance of digital advertising content.

2. The method of claim 1, wherein presenting on the graphical user interface each skip option of the plurality of skip options comprises presenting each skip option of the plurality of skip options at a different location in a viewing area during the streaming of the single instance of digital advertising content.

3. The method of claim 1, wherein presenting on the graphical user interface each skip option of the plurality of skip options comprises:
   presenting a first skip option at a first time and at a first location during the streaming of the single instance of digital advertising content; and
   presenting a second skip option at a second time and a second location during the streaming of the single instance of digital advertising content, the first time differing from the second time and the first location differing from the second location.

4. The method of claim 1, wherein presenting on the graphical user interface each skip option of the plurality of skip options comprises presenting a pre-defined quantity of skip options based on a duration of the single instance of digital advertising content, wherein each skip option of the plurality of skip options is presented for a random duration.

5. The method of claim 1, wherein presenting on the graphical user interface each skip option of the plurality of skip options comprises presenting the plurality of skip options only after or before a display of a brand or a promotional message in the single instance of digital advertising content.

6. The method of claim 1, wherein presenting on the graphical user interface each skip option of the plurality of skip options comprises presenting each skip option of the plurality of skip options for the limited duration based on historical usage behavior of a user interacting with previously presented skip options.

7. A non-transitory computer readable medium for storing computer instructions thereon that, when executed by at least one processor, causes a computing device to perform a method for improving viewer engagement in video advertising comprising:
   streaming different instances of digital advertising content;
   tracking user behavior and interactions with skip options presented during the streaming of the different instances of digital advertising content;
   presenting on a graphical user interface a plurality of skip options in a single instance of digital advertising content, such that each skip option of the plurality of skip options is presented in series for a limited duration at a location and a time of placement during a streaming of the single instance of digital advertising content until a presented one of the skip options is selected or until the single instance of digital advertising content completes, wherein the location and time of placement is selected based on the tracked user behavior and interactions with the skip options;
   detecting a selection of one skip option of the plurality of skip options; and
   in response to detecting the selection of the one skip option of the plurality of skip options, skipping the single instance of digital advertising content.

8. The non-transitory computer readable medium of claim 7, wherein presenting on the graphical user interface the plurality of skip options in the single instance of digital advertising content comprises presenting each skip option in the plurality of skip options at a different location in a viewing area during the streaming of the single instance of digital advertising content.

9. The non-transitory computer readable medium of claim 7, further comprising instructions that, when executed by the at least one processor, cause the computer device to perform steps comprising:
   identifying a most probable time and location at which a user will select a skip option based on the tracked user behavior and interactions with the skip options; and
   wherein presenting on the graphical user interface the plurality of skip options in the single instance of digital advertising content comprises presenting each skip option in the plurality of skip options at a time and location other than the identified most probable time and location.

10. The non-transitory computer readable medium of claim 7, wherein presenting on the graphical user interface the plurality of skip options in the single instance of digital advertising content comprises presenting a pre-defined quantity of skip options based on a duration of the single instance of digital advertising content, wherein each skip option of the plurality of skip options is presented for a random duration.

11. The non-transitory computer readable medium of claim 7, wherein presenting on the graphical user interface the plurality of skip options in the single instance of digital advertising content comprises presenting the plurality of skip options only before or after a display of a brand or a promotional message in the single instance of digital advertising content.

12. The non-transitory computer readable medium of claim 7, wherein tracking user behavior and interactions with skip options presented during the streaming of the different instances of digital advertising content comprises:
tracking how long a skip option is presented until a viewer selects the skip option; and
tracking whether the viewer opens or views a different display window during presentation of the skip options.

13. The non-transitory computer readable medium of claim 7, wherein:
tracking user behavior and interactions with the skip options presented during the streaming of the different instances of digital advertising content comprises identifying that a viewer, on average, selects a skip option in less than a first amount of time; and
presenting on the graphical user interface the plurality of skip options in the single instance of digital advertising content comprises presenting each skip option to the viewer only after a passage of time greater than the first amount of time.

14. The non-transitory computer readable medium of claim 7, further comprising instructions that, when executed by the at least one processor, cause the computer device to perform steps comprising:
identifying a most probable time at which a user will select a skip option based on the tracked user behavior and interactions with the skip options; and
wherein presenting on the graphical user interface the plurality of skip options in the single instance of digital advertising content comprises presenting each skip option at a time other than the identified most probable time.

15. A system comprising:
at least one processor; and
at least one non-transitory computer readable storage medium storing instructions that, when executed by the at least one processor, cause the system to:
provide for display on a graphical user interface a plurality of skip options in a single instance of digital advertising content;
stream the single instance of digital advertising content;
present on the graphical user interface, during the streaming of the single instance of digital advertising content, each skip option of the plurality of skip options in series for a limited duration at a random time and a random location during display of the single instance of digital advertising content until a presented one of the skip options is selected or until the single instance of digital advertising content completes;
detect a selection of one skip option of the plurality of skip options; and
in response to detecting the selection of the one skip option of the plurality of skip options, skip the single instance of digital advertising content.

16. The system of claim 15, wherein the instructions, when executed by the at least one processor, cause the system to present on the graphical user interface each skip option of the plurality of skip options by performing steps comprising presenting each skip option of the plurality of skip options at a different location in a viewing area during the streaming of the single instance of advertising.

17. The system of claim 15, wherein the instructions, when executed by the at least one processor, cause the system to present on the graphical user interface each skip option of the plurality of skip options by performing steps comprising:
presenting a first skip option at a first time and at a first location during the streaming of the single instance of digital advertising content; and
presenting a second skip option at a second time and a second location during the streaming of the single instance of digital advertising content, the first time differing from the second time and the first location differing from the second location.

18. The system of claim 15, wherein the instructions, when executed by the at least one processor, cause the system to present on the graphical user interface each skip option of the plurality of skip options by performing steps comprising presenting a pre-defined quantity of skip options based on a duration of the single instance of digital advertising content, wherein each skip option of the plurality of skip options is presented for a random duration.

19. The system of claim 15, wherein the instructions, when executed by the at least one processor, cause the system to present on the graphical user interface each skip option of the plurality of skip options by performing steps comprising presenting the plurality of skip options only after or before a display of a brand or a promotional message in the single instance of digital advertising content.

20. The system of claim 15, wherein the instructions, when executed by the at least one processor, cause the system to present on the graphical user interface each skip option of the plurality of skip options by performing steps comprising presenting each skip option of the plurality of skip options for the limited duration based on historical usage behavior of a user interacting with previously presented skip options.

* * * * *